(12) United States Patent
Nuri

(10) Patent No.: US 12,045,303 B1
(45) Date of Patent: Jul. 23, 2024

(54) ERROR MESSAGE REPLACEMENT SYSTEM

(71) Applicant: SAP SE, Walldorf (DE)

(72) Inventor: Nadav Nuri, Tzuran (IL)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/133,751

(22) Filed: Apr. 12, 2023

(51) Int. Cl.
G06F 16/958 (2019.01)
G06F 11/07 (2006.01)

(52) U.S. Cl.
CPC ........ *G06F 16/958* (2019.01); *G06F 11/0703* (2013.01)

(58) Field of Classification Search
CPC .......................... G06F 16/958; G06F 11/0703
See application file for complete search history.

(56) References Cited

U.S. PATENT DOCUMENTS

| | | | |
|---|---|---|---|
| 6,526,529 B1* | 2/2003 | Miksovsky | G06F 11/327 714/E11.187 |
| 8,326,794 B1* | 12/2012 | Wood | H04L 43/0817 707/600 |
| 2004/0250118 A1* | 12/2004 | Andreev | H04L 63/0815 726/8 |
| 2006/0041637 A1* | 2/2006 | Jerrard-Dunne | H04L 67/567 709/219 |
| 2011/0283340 A1* | 11/2011 | Ganesan | G06Q 20/382 726/4 |
| 2012/0246553 A1* | 9/2012 | Ong | G06F 21/606 715/234 |
| 2014/0359379 A1 | 12/2014 | Thakare et al. | |
| 2022/0092148 A1 | 3/2022 | Ross et al. | |

FOREIGN PATENT DOCUMENTS

WO   WO 2015/114419 A2   8/2015

OTHER PUBLICATIONS

Extended European Search Report, dated May 6, 2024, for European Patent Appl. No. 23214357.8, 9 pages.

* cited by examiner

*Primary Examiner* — Kuen S Lu
(74) *Attorney, Agent, or Firm* — Sterne, Kessler, Goldstein & Fox P.L.L.C.

(57) ABSTRACT

Various embodiments for an error message replacement system are described herein. An embodiment operates by receiving, at a computing device, a request from a browser to access a website external to a domain of the computing device. The request is provided to a server associated with the website and a response is received. Within the response, an error code indicating that the request was not properly executed by the server is identified. The response includes an identification of a first error page. A second error page corresponding to the error code is identified. The second error page is provide for display, at the browser, in lieu of the first error page responsive to identifying the error code.

20 Claims, 3 Drawing Sheets

ERROR MESSAGE REPLACEMENT SYSTEM

BACKGROUND

Many websites, web applications, and other Internet applications issue error codes when something goes wrong. One problem with these error codes is that they are often targeted to developers or other users with technical experience or understanding. As such, these error codes can be disconcerting to non-technical users that often do not have the knowledge, experience, ability, or responsibility to understand or address these error codes. This often leaves a user feeling stuck and helpless, and slows down productivity as well as increases user dissatisfaction with a system.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Many websites, web applications, and other Internet applications issue error codes when something goes wrong. One problem with these error codes is that they are often targeted to developers or other users with technical experience or understanding. As such, these error codes can be disconcerting to non-technical users that often do not have the knowledge, experience, ability, or responsibility to understand or address these error codes. This often leaves a user feeling stuck and helpless, and slows down productivity as well as increases user dissatisfaction with a system.

Figure 1:
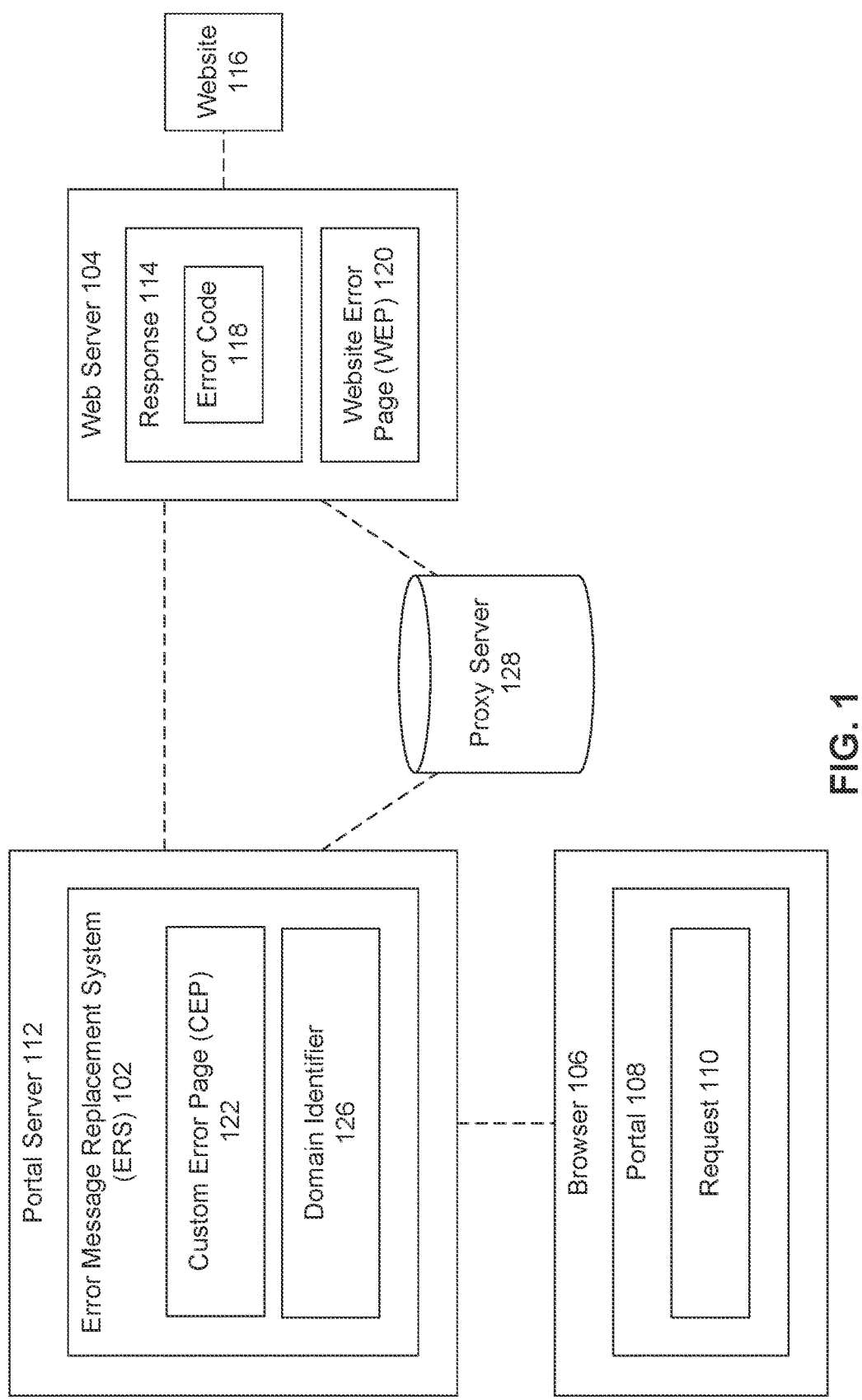
FIG. 1 illustrates a block diagram illustrating an error message replacement system (ERS), according to some example embodiments.

FIG. 1 illustrates a block diagram 100 illustrating an error message replacement system (ERS) 102, according to some example embodiments. In some embodiments, the ERS 102 may identify or intercept error messages received from a web server 104, before they are displayed for a user on a browser 106, and replace the error messages with new customized error messages that are more user friendly and/or adhere to the look-and-feel of a host system or website.

In some embodiments, a user may be viewing a website or a portal 108 in a browser 106 operating on a mobile phone, laptop, tablet, SMART television, or other internet-capable computing device. Through the browser 106, the user may be accessing a portal 108. The portal 108 may include a webpage or website that includes information, functions, and/or capabilities that are of interest to the user. In some embodiments, the information and/or functionality available to a user via the portal 108 may leverage the operational capabilities of one or more other webpages, websites, apps, applications, servers, or other devices. For example, the portal 108 may include a webpage that displays the weather, however the weather information may be imported or retrieved from another outside weather service, weather webpage, or weather app. The portal 108 may receive updated weather information, and may update the look-and-feel of the weather information to be consistent with the look-and-feel (e.g., color scheme, background, images, text size, font characteristics, etc.) of the portal 108.

In some embodiments, the user may not be aware that the weather information is being retrieved from another website or weather service. As such, presenting a unified look-and-feel may be important to enhancing the user experience. It is understood that weather is only one example of data or functionality that may be leveraged from other systems by the portal 108. In other embodiments, any type of information or functionality may be accessed via the portal 108 from one or more other websites, apps, or other web services. Other examples include access to another database of information about company sales, sports statistics, stock trading, and travel bookings. In some embodiments, the portal 108 may be a high-traffic website with a wide range of content, services and vendor links. The portal 108 may act as a value-added middleman by selecting the content sources and assembling them in a simple-to-navigate and customize interface for presentation to the end user.

In some embodiments, this external information that is received or accessible from one or more websites or web services may be accessible to the user via a section or frame of portal 108. In some embodiments, portal 108 may utilize one or more iFrames (acronym for inline frames) to provide access to this external information or functionality. An iFrame may be an element that loads another HTML (hypertext markup language) element inside of a webpage, wherein the webpage may be the portal 108. The browser 106 may include a web browser or app that is operating on a user device, and that can be used to view, access, provide input, and otherwise interact with the portal 108.

In some embodiments, a user may submit a request 110 via the portal 108. The request 110 may include a request to perform a function, a request to access or update information, a request for a new webpage or access or a particular application, a request to perform a calculation, or any other type of request. In some embodiments, the request 110 may include data provided by or input by the user, and/or user authentication information (e.g., such as username password information, or other textual or auditory input). The request 110 may be received by a portal server 112.

In some embodiments, the portal server 112 may include one or more computing devices that provide information and/or functionality of the portal 108 to the browser 106. In some embodiments, the browser 106 may be in direct communication with the portal server 112. Any user interactions with or requests 110 from the portal 108 may be directed to and received by the portal server 112. In some embodiments, the ERS 102 may be operational on the one or more computing devices, or a subset of the computing devices, of portal server 112.

In some embodiments, the portal server 112 may provide the request 110 to a web server 104. The web server 104 may include one or more computing devices that are configured to receive, distribute, and/or otherwise process the particular the request 110 received from the portal 108 and generate a response 114. In some embodiments, the portal server 112 may receive different requests 110 from the same browser 106 or from different users using different browsers 106, and each request 110 may be directed to a different web server 104 that may be responsible for generating a response 114 providing the requested information or functionality. As such, the portal server 112 may manage and redirect different requests 110 to different web servers 104 depending on the web address or domain associated with the request 110. For simplicity, only a single web server 104 is illustrated in FIG. 1.

In some embodiments, the web server 104 may provide or make available a website 116 to different user devices. The website 116 may include one or more web pages, a web application, an app, a database or document storage system, or other information or functionality that is accessible via one or more user or computing devices either directly (e.g., through a dedicated webpage or application) and/or indirectly through the portal 108. In some embodiments, the website 116 may include any functionality, including backend functionality (e.g., such as data access, data retrieval, data update), that is performed by the web server 104 responsive to the request 110.

As noted above, web server 104 may generate a response 114 to request 110. If processing the request 110 is successful, then the response 114 may indicate a webpage, file, or particular information to be displayed on browser 106, that is received by portal server 112. Portal server 112 may then display in the information or retrieved file or webpage in the designated frame of portal 108. In some embodiments, portal server 112 may adjust the look-and-feel of the response 114 or match the look-and-feel of portal 108.

However, there may be times when processing the request 110 is unsuccessful for some reason. For example, in executing the request 110, an error or exception may occur at the web server 104 or another element involved in generating the response 114. Example errors may include that the web server 104 crashes, the code is not executing properly, the internet connection is terminated, etc. The errors may include any number of errors or exceptions, including but not limited to, missing information, invalid requests, authentication errors, server unavailable errors, or other errors. If an error or exception does occur when processing the request 110, the error or exception may be indicated in the response as by an error code 118.

The error code 118 may be any indication that the processing of the request 110 was unsuccessful. In some embodiments, the error code 118 may include an alphanumeric code or identifier that corresponds to a particular detected or identified error or reason for the failure. For example, an error code 118 with a value of 500 may correspond to an unexpected condition that prevented the web server 104 from being able to fulfill the request 110.

In some embodiments, the response 114 may also include a src (source) indication that points to a first error page which may be referred to as a website error page (WEP) 120. The src attribute may specify the URL (universal resource locator) or path of a resource file. The URL points to the resource file which may include a media file to display (images) or play (audio and video). The browser uses the URL to locate and load the media file. The URL can be internal (from same website 116) or external to the web server 104 (e.g., from another website). In some embodiments, if the response 114 is successfully generated, the src indication may point to another webpage that is to be displayed in the portal 108 in the corresponding iframe associated with the web server 104 and/or the website 116.

In some embodiments, the WEP 120 may be a generic or other webpage generated, provided by, or otherwise made available by the web server 104 in response to detecting the error code 118. The WEP 120 may include the error code 118 and/or other messaging indicating that the processing of request 110 was unsuccessful.

Conventionally, the WEP 120 would be automatically be retrieved from the web server 104 (in processing the src attribute of response) when an error code 118 is indicated and displayed in the portal 108 for an end user. However, displaying the WEP 120 may cause confusion for the end user, because the WEP 120 may not make sense of an end user, and may include a different look-and-feel relative to the portal 108. Also, simply displaying the WEP 120 may leave the user without recourse or knowing what to do to resolve the error, which may both slow user productivity and increase user dissatisfaction which may cause users to stop using the portal 108 and switch to a competitor. In particular, the indicated error may not be actionable for the user, as the error originates in a domain that may be outside the user's sphere of influence.

The ERS 102 addresses this issue by providing a second error page referred to as a custom error page (CEP) 122 in lieu of WEP 120 when an error code 118 is detected in response 114. For example, rather than automatically processing and retrieving whatever webpage is indicated in the src attribute of the response 114 for display in the portal 108, the ERS 102 may first determine whether the response 114 includes an error code 118.

For example, upon receiving the response 114 at the portal server 112, the ERS 102 may scan the contents of the response 114 to identify any alphanumeric text indicating that an error has occurred. If there is no error code 118 indication detected in the response 114, then the portal server 112 may retrieve the webpage, text, image, or other media/content indicated by the src attribute and display the retrieved webpage (indicated in the response 114) in the portal 108.

If, however, the ERS 102 detects that the response 114 includes an error code 118, then rather than retrieving the webpage of the src attribute (which would be the WEP 120), the ERS 102 may instead display the CEP 122.

The CEP 122 may be a custom designed webpage that is intended to be displayed in the portal 108 when an error code 118 is detected in response 114. The error code 118 may include any alphanumeric code that may be provided in response 114 with regard to an error. As provided above, an example error code 118 is 500 which may indicate that a server was not able to fulfill the request 110.

Rather than being a generic WEP 120, the CEP 122 may provide the user with additional or different information, with a custom look-and-feel that corresponds to the look-and-feel of portal (e.g., using the same color scheme, etc.), that improves the user experience with the portal 108. For example, rather than displaying a WEP 120 that indicates "Error code 500—server unable to fulfill request", the CEP 122 may include a customized message to user such as "We could not process this request because of a server error, please try your request again after 60 seconds." This CEP 122 explains to the user what happened, and also provides the user next steps as to what the user can do. Some next steps that may be included in the CEP 122 may include "contact your administrator", "please re-enter your username and password and try again", or "call the helpdesk at 800-555-5656."

In some embodiments, the CEP 122 may be customized for each different error code 118 that is likely to be detected in response 114. The CEP 122 may also include a generic webpage that is used for any unrecognized error codes 118, or that may be used across all or a subset of error codes 118.

The ERS 102 may save network resources and communication bandwidth, because rather than having to retrieve WEP 120 from another domain server, the ERS 102 may retrieve the CEP 122 from a local storage of the portal server 112 or a storage device residing in the same domain as the portal server 112 (which would be faster than retrieving something from an outside device on another network, such as the web server 104), which may also increase security (as the CEP 122 is retrieved from a known source, behind the same firewall as portal server 112) and allow for greater throughput and network bandwidth to be available for other applications. Also, the CEP 122 may already be designed with the same look-and-feel of the portal 108, so no additional computing resources would be wasted on converting the WEP 120 to the look-and-feel of the portal 108.

In some embodiments, the portal server 112 may search the response 114 for an error code 118 and in parallel retrieve the webpage of the src attribute (which may include either a normal response webpage (not shown) or the WEP 120 from the web server 104 or another server. This may save time if no error code 118 is found or detected, then the normal response webpage may be displayed in the corresponding iframe of portal 108 from which the request 110 was received. However, if error code 118 is detected, than a CEP 122 may be displayed instead of or in lieu of the retrieved WEP 120. For example, the portal 108 may include several different iframes, each one of which corresponds to a different website 116 or web server 104. The portal 108 may track from which iframe a request 110 is received, and return the response 114 or the CEP 112 to be displayed on the portal 108 in the iframe from which the request 110 was received.

In some embodiments, a particular organization may be hosting or providing or making portal 108 available to its employees, clients, customers, or users. The ERS 102 may provide the organization with the power and flexibility to customize and upload the CEPs 112 that the organizations wants its users to see when an error code 118 is detected in a response 114.

In some embodiments, the ERS 102 may operate on a proxy server 128 (e.g., instead of portal server 112). The proxy server 128 may allow for increased security, by serving as an intermediary between the portal server 112 and external computing devices (e.g., on other domains), such as the web server 104. The portal server 112 may provide the request 110 to the proxy server 128, which may provide the request 110 to the web server 104. The web server 104 may provide the response 114 back to the proxy server 128, where the ERS 102 may scan the response 114 for an error code 118. If any error code 118 is detected, then the proxy server 128 may signal to the portal server 112 the error code 118, and indicate that the CEP 122 is to be loaded to the portal 108. In some embodiments, the proxy server 128 may not retrieve the WEP 120, in other embodiments, if the WEP 120 is retrieved, the proxy server 128 may not provide the WEP 120 to the portal server 112 when an error code 118 is detected.

In some embodiments, a domain identifier 126 may identify a domain corresponding to the request 110. The domain identifier 126 may identify whether the web server 104 is within the same network (e.g., the same domain or managed by the same administrator(s)) as the portal server 112 with the same security protocols, or in a different or external network. If the web server 104 is detected in an external network, then scanning the response 114 for an error code 118 may be performed by the ERS 102 as described above.

When the domain identifier 126 identifies the domain corresponding to the request 110 as being an external domain, then the ERS 102 may be configured to operate on the portal server 112 or a proxy server 128 (if available). If, however, the domain identifier 126 identifies that the domain of the request 110 is local (e.g., on the same network) as the portal server 112, then the portal server 112 (or the ERS 102) may transmit a head request to the web server 104. A head request may be an AJAX (asynchronous JAVASCRIPT and XML) request that allows servers in the same domain to quickly communicate with one another.

The head request may be transmitted with or prior to the request 110. The head request may be a leaner message (e.g., with less content thus requiring less bandwidth to transmit) relative to the request 110, thus may improve the response speeds of the system. A response 114 to the head request may then simply be what the error code 118 (if any was generated), which may also be faster than generating a full response 114 with an error code 118 indication. If the response 114 to the head request is empty or NULL, then the ERS 102 may determine that the request 110 was successfully executed. Using the head request may prevent the ERS 102 from needing to wait for the full response 114 and then search for the error code 118. If the error code 118 is identified in the response 114 to head request, then the ERS 102 may signal the portal server 112 to load a corresponding CEP 122.

Figure 2:
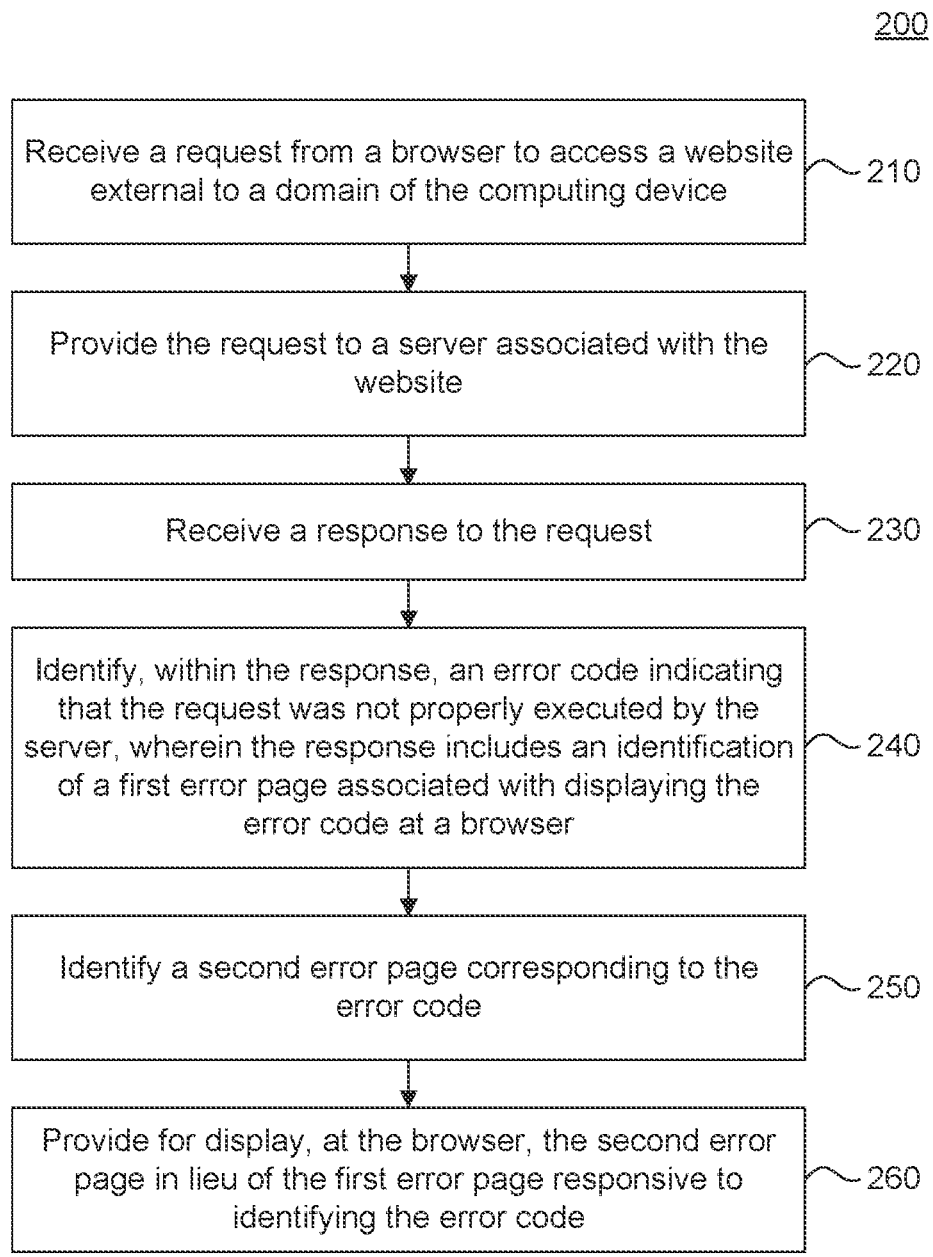
FIG. 2 is a flowchart illustrating a process for an error message replacement system (ERS), according to some embodiments.

FIG. 2 is a flowchart illustrating a process 200 for an error message replacement system (ERS) 102, according to some embodiments. The method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to the figures.

In 210, a request is received from a browser to access a website external to a domain of the computing device. For example, the ERS 102 may receive request 110 from browser 106. A domain identifier 126 may determine that the domain of the request 110 is external to the domain of the portal server 112 and/or the proxy server 128 on which the ERS 102 may be operational.

In 220, the request is provided to a server associated with the website. For example, the portal server 112 (or the proxy server 128) may provide the request 110 to the web server 104 that is hosting the website 116 associated with the request 110.

In 230, a response to the request is received. For example, the web server 104 may process the request 110 and provide a response 114 which is received by the ERS 102.

In 240, an error code indicating that the request was not properly executed by the server is identified within the response, wherein the response includes an identification of a first error page associated with displaying the error code at a browser. For example, the ERS 102 may identify that the response 114 includes an error code 118. The response 114 may also include an indication as to a particular WEP 120 that is to be used to communicate the error code 118.

In 250, a second error page corresponding to the error code is identified. For example, the ERS 102 may identify a different CEP 122 that corresponds to the error code 118 to provide to the browser 106 for display in the portal 108. In some embodiments, different CEPs 122 may correspond to different error codes 118.

In 260, the second error page is provided for display, at the browser in lieu of the first error page responsive to identifying the error code. For example, the ERS 102 or the portal server 112 may provide the CEP 122 (or an address or link to the CEP 122) to the browser 106, which may display the CEP 122 in the portal 108 in response to the request 110.

Figure 3:
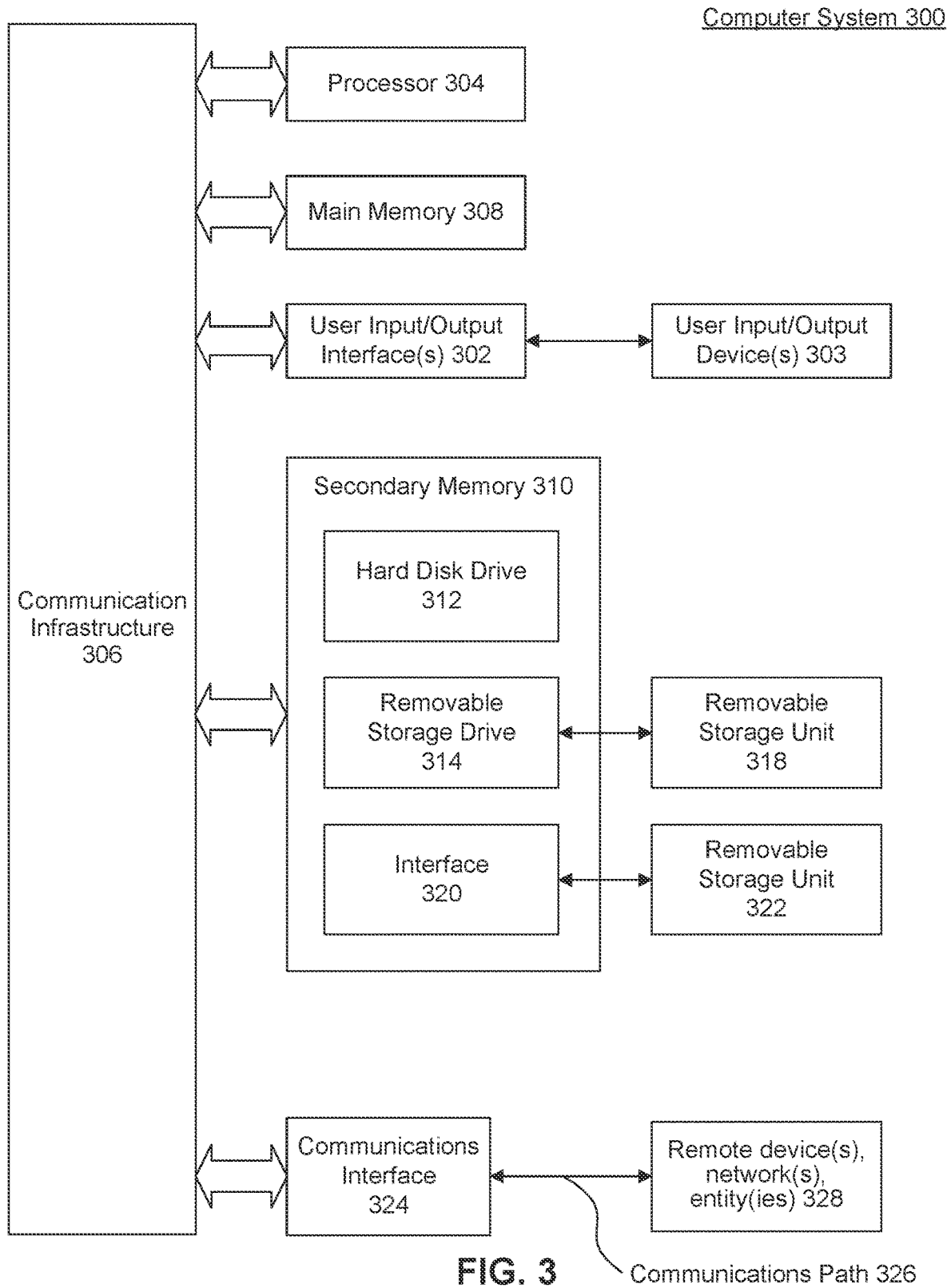
FIG. 3 illustrates an example computer system useful for implementing various embodiments.

Various embodiments and/or components therein can be implemented, for example, using one or more computer systems, such as computer system 300 shown in FIG. 3. Computer system 300 can be any computer or computing device capable of performing the functions described herein. For example, one or more computer systems 300 can be used to implement any embodiments, and/or any combination or sub-combination thereof.

Computer system 300 includes one or more processors (also called central processing units, or CPUs), such as a processor 304. Processor 304 is connected to a communication infrastructure or bus 306. Computer system 300 may represent or comprise one or more systems on chip (SOC).

One or more processors 304 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 can include one or more levels of cache. Main memory 308 has stored therein control logic (i.e., computer software) and/or data.

Computer system 300 can also include one or more secondary storage devices or memory 310. Secondary memory 310 can include, for example, a hard disk drive 312 and/or a removable storage device or drive 314. Removable storage drive 314 can be a floppy disk drive, a magnetic tape drive, a compact disk drive, an optical storage device, tape backup device, and/or any other storage device/drive.

Removable storage drive 314 can interact with a removable storage unit 318. Removable storage unit 318 includes a computer usable or readable storage device having stored thereon computer software (control logic) and/or data. Removable storage unit 318 can be a floppy disk, magnetic tape, compact disk, DVD, optical storage disk, memory card, and/any other computer data storage device. Removable storage drive 314 reads from and/or writes to removable storage unit 318 in a well-known manner.

According to an exemplary embodiment, secondary memory 310 can include other means, instrumentalities or other approaches for allowing computer programs and/or other instructions and/or data to be accessed by computer system 300. Such means, instrumentalities or other approaches can include, for example, a removable storage unit 322 and an interface 320. Examples of the removable storage unit 322 and the interface 320 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 can further include a communication or network interface 324. Communication interface 324 enables computer system 300 to communicate and interact with any combination of remote devices, remote networks, remote entities, etc. (individually and collectively referenced by reference number 328). For example, communication interface 324 can allow computer system 300 to communicate with remote devices 328 over communications path 326, which can be wired and/or wireless, and which can include any combination of LANs, WANs, the Internet, etc. Control logic and/or data can be transmitted to and from computer system 300 via communication path 326.

In some embodiments, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   receiving, at a portal server, a request from a browser to access a website external to a domain of the portal server;
   providing the request to a web server associated with the website;
   receiving, at the portal server, a response to the request;
   searching for an error code within the response, the error code indicating that processing the request was unsuccessful, wherein the response includes an identification of a web page;
   retrieving, in parallel with the searching, the web page corresponding to the response, wherein the webpage comprises one of a response webpage or a first error page associated with displaying the error code at the browser;
   identifying the error code within the response based on the searching;
   identifying a second error page corresponding to the error code; and
   providing for display, at the browser, the second error page in lieu of the retrieved first error page responsive to identifying the error code.

2. The method of claim 1, wherein the request is received at the portal server that is communicatively coupled to a proxy server that performs the receiving the response to the request, the providing, and the identifying the error code.

3. The method of claim 1, wherein the portal server retrieves the first error page.

4. The method of claim 1, wherein the second error page is stored on the domain of the portal server.

5. The method of claim 1, wherein the computing device comprises a portal website and the request is received from an iFrame displayed in the browser.

6. The method of claim 5, wherein the second error page includes one or more of text or an image that is different from the first error page, and wherein the second error page is provided by an organization associated with the portal website.

7. The method of claim 1, wherein the identifying the second error page corresponding to the error code comprises:
   identifying a plurality of customized error pages stored locally on the domain of the portal server, the customized error pages corresponding to a different error code; and
   identifying a first customized error page, of the plurality of customized error pages, that corresponds to the error code identified within the response.

8. The method of claim 1, wherein a look-and-feel of the second error page corresponds to a portal on which the second error page is displayed, and wherein the look-and-feel of the second error page is different from a look-and-feel of the first error page.

9. A system comprising at least one processor, the at least one processor configured to perform operations comprising:
   receiving, at a portal server, a request from a browser to access a website external to a domain of the portal server;
   providing the request to a web server associated with the website;
   receiving, at the portal server, a response to the request;
   searching for an error code within the response, the error code indicating that processing the request was unsuccessful, wherein the response includes an identification of a web page;
   retrieving, in parallel with the searching, the web page corresponding to the response, wherein the webpage comprises one of a response webpage or a first error page associated with displaying the error code at the browser;
   identifying the error code within the response based on the searching;
   identifying a second error page corresponding to the error code; and
   providing for display, at the browser, the second error page in lieu of the first error page responsive to identifying the error code.

10. The system of claim 9, wherein the request is received at the portal server that is communicatively coupled to a proxy server that performs the receiving the response to the request, the providing, and the identifying the error code.

11. The system of claim 9, wherein the portal server provides a request to retrieve the first error page.

12. The system of claim 9, wherein the second error page is stored on the domain of the portal server.

13. The system of claim 9, wherein the portal server comprises a portal and the request is received from an iFrame displayed in the browser.

14. The system of claim 13, wherein the second error page includes one or more of text or an image that is different from the first error page, and wherein the second error page is provided by an organization associated with the portal.

15. The system of claim 9, wherein the identifying the second error page corresponding to the error code comprises:
   identifying a plurality of customized error pages uploaded to the portal server by one or more users, each of the customized error pages corresponding to a different error code; and
   identifying a first customized error page, of the plurality of customized error pages, that corresponds to the error code identified within the response.

16. A non-transitory computer-readable medium having instructions stored thereon that, when executed by at least one portal server, cause the at least one portal server to perform operations comprising:
   receiving, at a portal server, a request from a browser to access a website external to a domain of the portal server;
   providing the request to a web server associated with the website;
   receiving, at the portal server, a response to the request;

searching for an error code within the response, error code indicating that processing the request was unsuccessful, wherein the response includes an identification of a web page;

retrieving, in parallel with the searching, the web page corresponding to the response, wherein the webpage comprises one of a response webpage or a first error page associated with displaying the error code at the browser;

identifying the error code within the response based on the searching;

identifying a second error page corresponding to the error code; and providing for display, at the browser, the second error page in lieu of the first error page responsive to identifying the error code.

17. The non-transitory computer-readable medium of claim 16, wherein the request is received at the portal server that is communicatively coupled to a proxy server that performs the receiving the response to the request, the providing, and the identifying the error code.

18. The non-transitory computer-readable medium of claim 16, wherein the portal server provides a request to retrieve the first error page.

19. The non-transitory computer-readable medium of claim 16, wherein the second error page is stored on the domain of the portal server.

20. The non-transitory computer-readable medium of claim 16, wherein the portal server comprises a portal and the request is received from an iFrame displayed in the browser.

* * * * *